United States Patent [19]

Koops

[11] Patent Number: 5,242,324
[45] Date of Patent: Sep. 7, 1993

[54] APPARATUS FOR PROCESSING GIZZARDS OF POULTRY

[75] Inventor: Henderikus Koops, Oostzaan, Netherlands

[73] Assignee: Machinefabriek Meyn B.V., Oostzaan, Netherlands

[21] Appl. No.: 959,300

[22] Filed: Oct. 9, 1992

[30] Foreign Application Priority Data

Oct. 9, 1991 [NL] Netherlands ............... 9101694

[51] Int. Cl.5 ............................................. A22C 21/00
[52] U.S. Cl. ......................................... 452/111; 452/113
[58] Field of Search ................. 452/111, 112, 113, 114

[56] References Cited

U.S. PATENT DOCUMENTS

| | | |
|---|---|---|
| 4,073,040 | 2/1978 | Hill ............................. 452/111 |
| 4,183,117 | 1/1980 | Meyn ........................... 452/111 |
| 4,466,158 | 8/1984 | DeLong ....................... 452/111 |
| 4,608,732 | 9/1986 | Hill et al. .................... 452/111 |
| 4,748,722 | 6/1988 | Risser et al. ................ 452/111 |
| 4,799,292 | 1/1989 | Harben ........................ 452/111 |

Primary Examiner—Willis Little
Attorney, Agent, or Firm—Dority & Manning

[57] ABSTRACT

An apparatus for processing the gizzards of poultry of various sizes which comprises a conveyor with drivers for moving the gizzards along the top of a guide past cutting means for cutting the gizzards open as they are moved along the guide. Auxiliary guide means is disposed along both sides of the top of the guide and moves in synchronism with the conveyor for guiding the gizzards as they move along the top of the guide past the cutting means. The auxiliary guide means may be driven by engaging the conveyor.

13 Claims, 2 Drawing Sheets ns5,242,324

APPARATUS FOR PROCESSING GIZZARDS OF POULTRY

BACKGROUND OF THE INVENTION

The invention relates to an apparatus for processing gizzards of poultry with supply means for supplying the gizzards to be processed in a correctly positioned manner. An endless conveyor extends around at least one driven return wheel which rotates around a horizontal axis. The conveyor comprises projecting drivers for engaging the supplied gizzards and for carrying these along a substantially horizontal track on top of a guide extending immediately below the lowermost part of the conveyor, and a cutting means positioned below the guide for cutting open the gizzards moved along on top of the guide.

Such an apparatus is disclosed in Dutch U.S. Pat. No. 182,276 in the name of applicant. In such a known apparatus gizzards of chicken are cut open and cleansed and peeled. Following the cutting means, which is shaped as a rotating knife, a cleansing means is provided for removing the gizzards contents from the gizzards spread open by a guide and, closely following the guide, peeling rolls are provided for tearing loose the gizzards membrane from supplied gizzards. When gizzards of larger poultry, such as turkeys, is processed with this known apparatus, in which the cutting means, in correspondence with recent developments, has been replaced by a nozzle ejecting a highly pressurized fluid, it appears that at the moment of cutting open the gizzards moved along on top of the guide the guiding of the gizzards is not optimal at the location of the cutting means.

SUMMARY OF THE INVENTION

It is an object of the invention to provide an apparatus for processing gizzards of poultry in which this disadvantage is eliminated in a simple, but nevertheless effective way.

The apparatus according to the invention is characterized in that, at least, near to the cutting means, at both sides of the guide and in parallel therewith, auxiliary guides for the gizzards extend which comprise conveyor belts or the like driven with the velocity of the conveyor.

As a result of this construction, the gizzards of larger poultry, such as the gizzards of turkeys, stay correctly centered on top of the guide at the moment the cutting means, such as a nozzle, is cutting.

Usually in apparatuses of this type provisions are made for deactivating the apparatus if the power consumption rises above a certain limit. For example, this is the case when pebbles or the like, which are often present in the gizzards, get stuck between moving parts of the apparatus. If the auxiliary guides were stationary there would be a risk that the power consumption of this apparatus, as a result of the friction occurring between these guides and the gizzards, would rise above the mentioned limit and the apparatus would be deactivated. For avoiding this, in accordance with the invention, the auxiliary guides are driven at the velocity of the conveyor. Thus, a correct guiding of the gizzards is obtained with little demand for extra power.

According to a preferred embodiment of the apparatus according to the invention each auxiliary guide is directly driven by the conveyor. In this manner complicated transmission mechanisms between the power source driving the conveyor and the auxiliary guides can be avoided, which mechanisms would drastically reduce the accessibility to the interior of the apparatus.

Constructively favorable in this aspect is an embodiment of the apparatus, in which the conveyor is provided with bosses engaging cooperating bosses on the auxiliary guides. For example, this solution may be realized when each auxiliary guide comprises an endless toothed belt extending around return wheels, the teeth of the belt being directed outwardly and acting as bosses that are engaged by the conveyor bosses. In this way each auxiliary guide is directly driven by the conveyor, thus ensuring that the velocity of the auxiliary guides corresponds with the velocity of the conveyor. Further, this provides the possibility of an easy adjustment of the auxiliary guides, both in height and in the transverse direction; for this no complicated driving means are required and care should only be taken that the bosses somewhere engage the teeth of the belt.

A constructively simple embodiment of the apparatus further is characterized in that the conveyor bosses are provided on the drivers.

BRIEF DESCRIPTION OF THE DRAWINGS

Hereinafter the invention will be elucidated by means of the drawings, in which an embodiment of the apparatus according to the invention is illustrated, wherein.

DETAILED DESCRIPTION OF THE INVENTION

Figure 1:
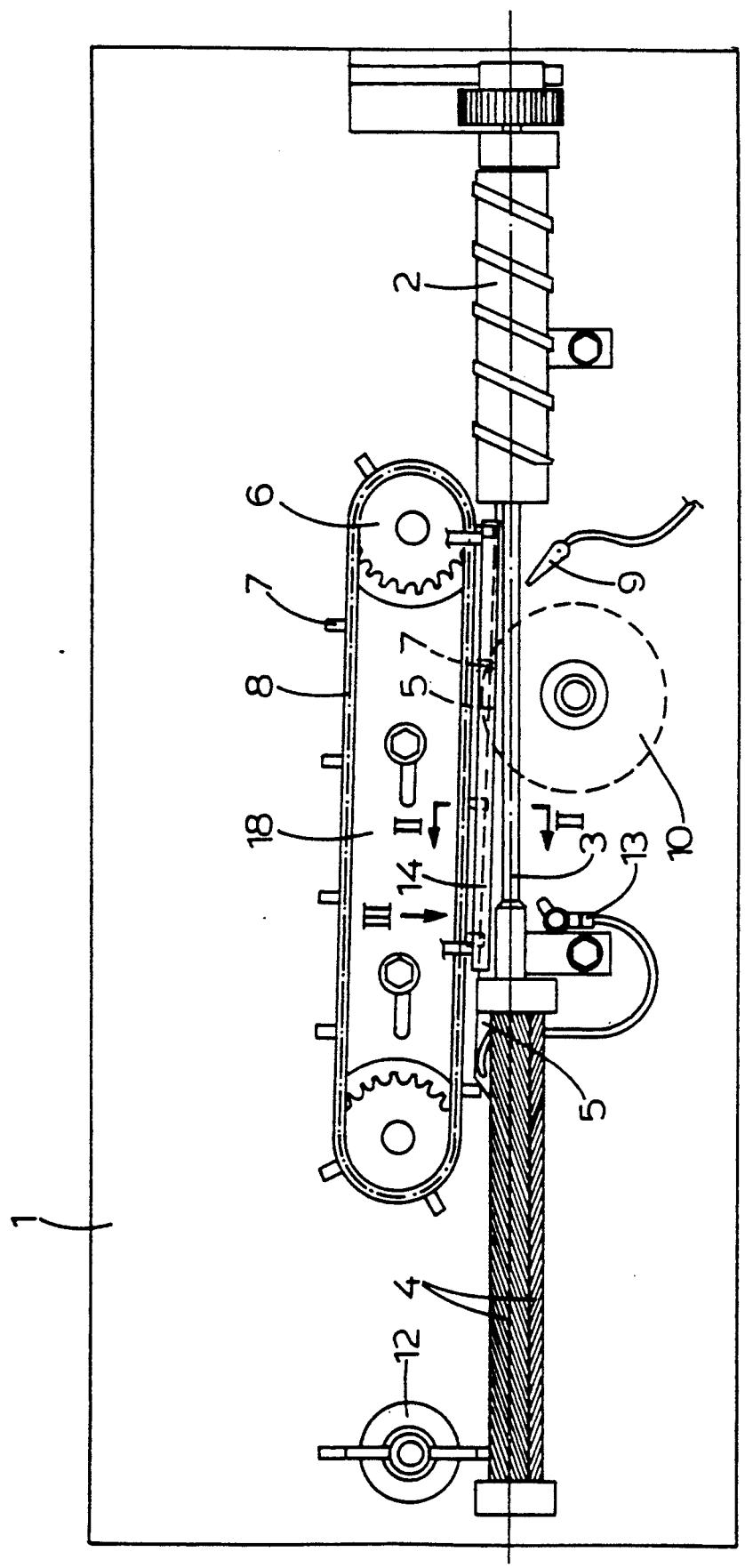
FIG. 1 is a side elevational view of an embodiment of the apparatus according to the invention.

The apparatus illustrated in the drawing is meant for cutting open, cleansing and peeling the gizzards of poultry, the gizzards previously being separated from the remaining entrails. The construction and operation of such an apparatus will be shortly indicated schematically hereinafter. For a detailed description of a substantially similar apparatus, reference is made to Dutch U.S. Pat. No. 182,276 filed in the name of applicant. In this known apparatus, however, the measures according to the invention, which will be elucidated hereinafter, are missing, whereas further a different kind of cutting means, a rotating knife, is provided.

In the view according to FIG. 1 the gizzards to be processed are moved through the apparatus from right to left. In a frame 1 supply rolls 2 are mounted which, through axes 3, are connected to peeling rolls 4. The gizzards, which are correctly positioned by the supply rolls 2, reach a guide 5 which, in FIG. 1, is mainly indicated in dotted lines. Above the guide 5 an endless conveyor 8, comprising projecting drivers 7, extends around a driven sprocket 6 and a return wheel. The drivers 7 may engage the supplied gizzards while carrying these along a substantially horizontal track on top of the guide 5.

Between the axes 3 a cutting means 9 shaped as a nozzle for ejecting highly pressurized fluid and a brush means 10 are positioned for successively cutting open the gizzards, which are moved onward on top of the guide 5 by the conveyor 8, and removing the gizzards contents from the gizzards spread open by the guide 5.

Finally, the gizzards reach the previously mentioned peeling rolls 4. Ultimately an ejection means 12 removes the gizzards from the peeling rolls 4.

A spraying device 13 may be applied for an additional cleansing of the spread open gizzards.

At least in the vicinity of the cutting means 9, at both sides of the guide 5 and in parallel therewith, auxiliary guides 14 for the gizzards are provided. The auxiliary guides 14 comprise endless conveyor belts or the like extending around return wheels 15. The return wheels may be adjustable in height or in transversal direction.

Figure 2:
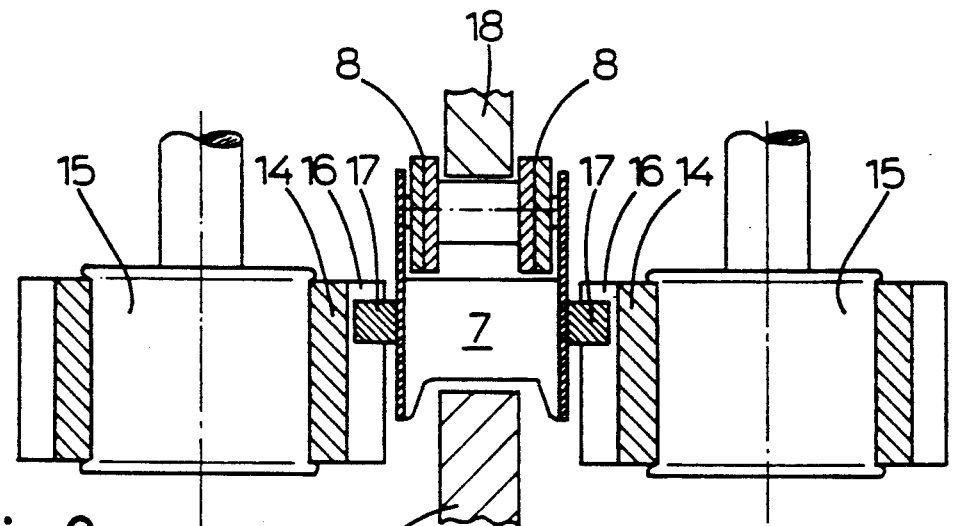
FIG. 2 is a cross-section view taken along line II—II in FIG. 1 on a larger scale.
Figure 3:
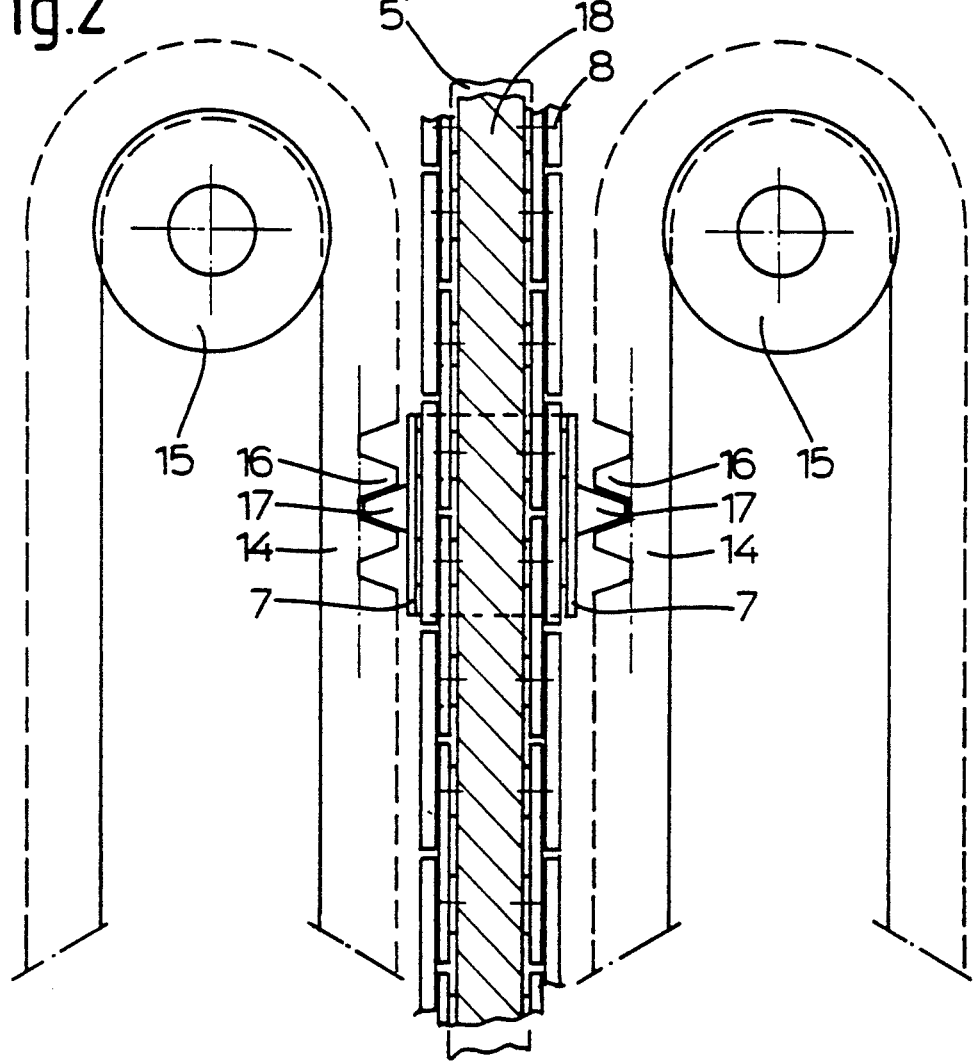
FIG. 3 is a view looking in the direction III in FIG. 1, on a larger scale.

As it appears specially in FIGS. 2 and 3 each auxiliary guide comprises an endless toothed belt extending around return wheels 15, the teeth 16 of said belt being directed outwardly.

On each driver 7 of the conveyor 8 two oppositely positioned bosses 17 are provided which engage between the teeth 16 of the belts 14.

Due to the cooperation between the bosses 17 of the conveyor 8 and the teeth 16 of the belts 14 the velocity of the conveyor 8 and the belts 14 will be equal. Obviously, it is not necessary that the bosses 17 are attached to the drivers 7; driving bosses directly connected to the conveyor 8 (shaped as a chain) are possible too.

Gizzards moved along on top of the guide 5 through the drivers 7 in the transverse direction are constrained by the auxiliary guides 14, such that a good positioning of the gizzards is obtained, especially when passing the cutting means 9.

It is possible that the belts 14 define a narrowing or widening guide for the gizzards. In any case, however, the bosses 17 should engage the teeth.

It is noted, that, in FIGS. 2 and 3, the shape of the guide 5 is only indicated schematically. Further these figures show a support 18 engaging the upper side of the lower section of the conveyor 8, that support forming a support for the conveyor 8 enabling an adjustment thereof. A detailed description thereof is part of the previously mentioned Dutch U.S. Pat. No. 182.276.

The invention is not limited to the embodiment described before, which can be varied widely within the scope of the invention. Thus, the shape and position of the auxiliary guides may differ from what has been shown, for example in that the auxiliary guides may be much shorter and only provided in the near vicinity of the cutting means.

I claim:

1. An apparatus for processing gizzards of various sizes, comprising:
   a) supply means for supplying gizzards in the proper position for processing;
   b) a guide for receiving and supporting said gizzards for movement along a horizontal path having a top surface for supporting said gizzards as they pass through said processing apparatus;
   c) a driven endless conveyor having projecting drivers for engaging said supplied gizzards and for moving them along said horizontal path;
   d) a cutting means disposed below said top surface for slitting said gizzards as they move along said horizontal path;
   e) driven auxiliary guide means extending along the opposite sides of said gizzards as they pass said cutting means in said horizontal path; and
   f) means for driving said auxiliary guide means at the same velocity as said endless conveyor.

2. Apparatus for processing gizzards as set forth in claim 1, wherein said auxiliary guide means is driven by said conveyor.

3. Apparatus for processing gizzards as set forth in claim 1, wherein said auxiliary guide means has a plurality of bosses for engaging a plurality of corresponding bosses disposed on said conveyor means for driving said auxiliary guide means.

4. Apparatus for processing gizzards as set forth in claim 3, wherein said auxiliary guide means comprise a pair of endless driven toothed belts, the teeth of which constitute the bosses on said belts and which engage bosses on said conveyor.

5. Apparatus for processing gizzards as set forth in claim 4, wherein said bosses on said conveyor are disposed on said drivers.

6. Apparatus for processing gizzards as set forth in claim 1, wherein said auxiliary guide means is a pair of endless conveyors.

7. Apparatus for processing gizzards as set forth in claim 6, wherein said auxiliary guide means is driven by said conveyor.

8. Apparatus for processing gizzards as set forth in claim 6, wherein said auxiliary guide means has a plurality of bosses for engaging a plurality of corresponding bosses disposed on said conveyor means for driving said auxiliary guide means.

9. Apparatus for processing gizzards as set forth in claim 1, wherein said cutting means is a nozzle for ejecting a pressurized fluid.

10. Apparatus for processing gizzards as set forth in claim 9, further comprising brush means for cleaning said gizzards after they are slit by said cutting means.

11. Apparatus for processing gizzards as set forth in claim 1, further comprising brush means for cleaning said gizzards after they are slit by said cutting means.

12. Apparatus for processing gizzards as set forth in claim 10, wherein said brush means comprises a driven rotary brush.

13. Apparatus for processing gizzards as set forth in claim 11, wherein said brush means comprises a driven rotary brush.

* * * * *